United States Patent [19]

Fukuoka et al.

[11] Patent Number: 5,232,677

[45] Date of Patent: * Aug. 3, 1993

[54] PREPARATION OF SILICON NITRIDE POWDER BY PARTIALLY NITRIDING IN A FLUIDIZED BED AND THEN COMPLETING NITRIDATION IN A MOVING BED

[75] Inventors: Hirofumi Fukuoka; Mutsuo Shimizu; Hidemitsu Ochiai, all of Annaka; Hideaki Shimizu, Gunma; Masanori Fukuhira, Takasaki, all of Japan

[73] Assignee: Shin-Etsu Chemical Co., Ltd., Tokyo, Japan

[ * ] Notice: The portion of the term of this patent subsequent to Dec. 17, 2008 has been disclaimed.

[21] Appl. No.: 647,142

[22] Filed: Jan. 29, 1991

[30] Foreign Application Priority Data

Jan. 31, 1990 [JP] Japan ............................. 2-21864

[51] Int. Cl.$^5$ .......................................... C01B 21/06
[52] U.S. Cl. .................................... 423/344; 422/142
[58] Field of Search .................... 423/344; 501/97; 422/142

[56] References Cited

FOREIGN PATENT DOCUMENTS

| 252597 | 12/1987 | Fed. Rep. of Germany | 423/344 |
| 58-151311 | 9/1983 | Japan . | |
| 60-186406 | 9/1985 | Japan . | |
| 61-097110 | 5/1986 | Japan | 423/344 |
| 61-266305 | 11/1986 | Japan . | |

Primary Examiner—Olik Chaudhuri
Assistant Examiner—Ken Horton
Attorney, Agent, or Firm—McAulay Fisher Nissen Goldberg & Kiel

[57] ABSTRACT

Silicon nitride powder is produced in two steps, by supplying metallic silicon powder to a fluidized bed composed of silicon nitride and nitrogen or ammonia gas where primary nitriding reaction is effected until the silicon powder is nitrided to an amount of at least 50% and transferring the nitrided product from the fluidized bed into a moving bed where secondary nitriding reaction is effected for nitriding the unreacted silicon with nitrogen or ammonia gas. This method is adapted for manufacture on a commercial scale because the silicon nitride powder thus obtained is consistent and has a very high degree of nitriding and a minimal variation in quality.

6 Claims, No Drawings

PREPARATION OF SILICON NITRIDE POWDER BY PARTIALLY NITRIDING IN A FLUIDIZED BED AND THEN COMPLETING NITRIDATION IN A MOVING BED

This invention relates to a method for preparing silicon nitride powder. More particularly, it relates to a commercially acceptable method for preparing silicon nitride powder having a very high degree of nitriding and a minimal variation in quality in a consistent manner.

BACKGROUND OF THE INVENTION

It is well known in the prior art to prepare silicon nitride powder by directly nitriding metallic silicon powder in a reactive gas containing nitrogen or ammonia gas. Most such methods for preparing silicon nitride powder rely on a fluidized bed system wherein the reactive gas forms a fluidized bed with silicon nitride. A nitriding source material in the form of metallic silicon powder is continuously supplied into the fluidized bed where the source material is nitrided while the nitrided product is continuously removed from the fluidized bed for recovery.

These methods using the fluidized bed have a problem that since the fluidized bed is a perfect mixing system, the nitrided product is removed and recovered therefrom along with the unreacted source material or metallic silicon, resulting in a loss of degree of nitriding. There are several approaches for overcoming this problem, for example, by (1) increasing the reaction temperature, (2) extending the residence or reaction time of the source powder, (3) using multiple stages of fluidized bed (multi-stage reaction), and (4) treating the nitrided product with acid to remove the unreacted metallic silicon. Approaches (1) to (3), however, require an extended operating time of the associated reactor, leading to a substantial loss of throughput per unit time and unit power while it is imperative that the product be accompanied by some unreacted source material. Also, approach (4) gives rise to an economic problem because the acid treatment requires time and expense.

It was also proposed to use a moving bed reactor for nitriding metallic silicon powder with a reactive gas containing nitrogen or ammonia gas. The typical reactors used are a shaft kiln as disclosed in Japanese Patent Application Kokai No. 151311/1983, a tunnel kiln as disclosed in Japanese Patent Application Kokai No. 186406/1985, and a rotary kiln as disclosed in Japanese Patent Application Kokai No. 266305/1986. With respect to variation in quality such as $\alpha$ to $\beta$ phase ratio, degree of nitriding, and productivity, these methods using such moving bed reactor are advantageous in some aspects, but disadvantageous in other aspects, so that they are not fully adapted for manufacture on a commercial scale.

SUMMARY OF THE INVENTION

An object of the present invention is to provide a new and improved method for preparing silicon nitride powder having a very high degree of nitriding and a minimal variation in quality in a consistent and economical manner to enable manufacture on a commercially acceptable scale.

The inventors have found that by nitriding metallic silicon powder in a fluidized bed and further nitriding the unreacted portion of the resulting nitrided product in a moving bed reactor, there can be obtained silicon nitride powder having consistent quality, for example, a constant $\alpha$ to $\beta$ phase ratio as well as a very high degree of nitriding, and that by controlling the process such that the nitriding reaction in the fluidized bed is effected only to a rate of nitriding of at least 50%, especially 60 to 90%, and the remaining unreacted portion is nitrided in the moving bed reactor, both the times required for reaction in the fluidized bed and reaction in the moving bed reactor are reduced to such an extent that the overall nitriding reaction is fully efficient for economy despite the two stage reaction.

According to the present invention, there is provided a method for preparing silicon nitride powder comprising the steps of:

continuously supplying a nitriding source material containing metallic silicon powder to a fluidized bed composed of silicon nitride and a reactive gas containing nitrogen or ammonia gas where primary nitriding reaction is effected until the metallic silicon powder is nitrided to an amount of at least 50%, and continuously transferring the resulting nitrided product from the fluidized bed to a moving bed reactor where secondary nitriding reaction is effected for nitriding the unreacted source material with a reactive gas containing nitrogen or ammonia gas.

DETAILED DESCRIPTION OF THE INVENTION

The metallic silicon powder which is used as the nitriding source material in the practice of the present invention is not particularly limited, although metallic silicon particles having a mean diameter of about 149 $\mu$m to about 4 mm are preferred. One suitable form of metallic silicon powder is obtained by adding a binder such as polyvinyl alcohol to fine metallic silicon powder having a mean diameter of smaller than about 44 $\mu$m, granulating the mixture into granules with a mean diameter of 149 $\mu$m to 4 mm, and firing the granules at 1100° to 1300° C. for such a brief time that silicon granules lightly adhere to each other, but do not melt. The source material may also be a powder mixture of metallic silicon powder as mentioned above and 5 to 50% by weight, preferably 10 to 30% by weight of silicon nitride powder having a mean diameter of about 149 $\mu$m to about 4 mm. The addition of such silicon nitride powder not only permits the source material to be supplied at an increased rate and the residence times in the fluidized and moving beds to be reduced, but is also effective for preventing fusion and aggregation of metallic silicon particles during nitriding reaction. It will be understood that a source material containing more than 50% by weight of silicon nitride powder can sometimes lead to a lowering of production rate whereas the addition of less than 5% by weight of silicon nitride powder provides no substantial benefit.

The first step of the method according to the present invention is to continuously supply the nitriding source material defined above to a fluidized bed, which is formed by silicon nitride powder and a reactive gas containing nitrogen or ammonia gas, where primary nitriding reaction is effected until the metallic silicon powder is nitrided to an amount of at least 50%, especially 60 to 90%. The source material is fed such that the average residence time may range from about 1 to about 100 hours, preferably about 2 to about 20 hours. The temperature of the fluidized bed is not particularly limited although temperatures of 1000° to 1500° C., especially 1200° to 1400° C. are preferred. The primary nitriding reaction in the fluidized bed may be a single stage reaction in a single fluidized bed although multi-stage reaction using two or more fluidized beds is also included as the case may be.

The reactive gas may be nitrogen or ammonia gas or a mixture thereof although a mixture of nitrogen or ammonia gas and a diluent gas such as hydrogen gas is often used. The concentration of nitrogen or ammonia gas in hydrogen gas generally ranges from about 20 to 100% by volume, preferably from about 50 to 100% by volume.

The next step is to continuously remove the resulting nitrided product from the fluidized bed, and to admit the nitrided product into a moving bed reactor where secondary nitriding reaction is effected for nitriding the unreacted source material in the nitrided product with a reactive gas containing nitrogen or ammonia gas. The concentration of nitrogen or ammonia in a diluent gas such as hydrogen may be the same as above. The reaction temperature is not particularly limited although temperatures of 1200° to 600° C., especially 1300° to 1500° C. are preferred. The average residence time may range from about 6 minutes to about 100 hours, preferably about 1 to about 10 hours. The moving bed reactor used herein is not particularly limited insofar as it has an extrusion flow mechanism. The preferred reactors are shaft kilns, rotary kilns, and tunnel kilns, for example.

The nitrided product is then removed from the moving bed reactor for recovery of silicon nitride powder having a high degree of nitriding and consistent quality such as $\alpha$ to $\beta$ phase ratio. The secondary nitriding reaction using a moving bed reactor can produce silicon nitride of higher quality within a shorter time (e.g., shorter by several ten hours) at a higher efficiency of nitriding than the prior art nitriding technique relying solely on a moving bed reactor as disclosed in Japanese Patent Application Kokai No. 151311/1983. The secondary nitriding reaction is to nitride again the nitrided product from the fluidized bed, at least 50% of which has been nitrided, so that the residence time in the moving bed can be reduced, resulting in silicon nitride powder of uniform quality. The reduced residence time is also effective for avoiding such troubles as fusion and aggregation of particles and suppressing vigorous nitriding reaction, and hence, for controlling the quality of silicon nitride powder including $\alpha$ to $\beta$ phase ratio. Since the method of the invention includes the later stage of nitriding reaction in a moving bed reactor, the product finally recovered therefrom does contain a minimized amount of unreacted metallic silicon and a very high degree of nitriding is achieved.

There has been described an improved method for preparing silicon nitride powder having a very high degree of nitriding and a minimal variation in quality such as $\alpha$ to $\beta$ phase ratio in a consistent manner. The method is also advantageous in economy and thus adapted for manufacture on a commercial scale.

EXAMPLE

Examples of the present invention are given below together with comparative examples, by way of illustration and not by way of limitation. N is an abbreviation for normal condition.

EXAMPLE 1

A reactor having an inside diameter of 80 mm and a heat zone length of 500 mm was loaded with 500 grams of silicon nitride powder, to which a reactive gas in the form of a gas mixture of 6 N-liter/min. of $N_2$ gas and 1.5 N-liter/min. of $H_2$ gas was supplied to form a fluidized bed. The fluidized bed was heated and maintained at 1300° C.

A nitriding source material in the form of metallic silicon powder granulated to a mean diameter of 0.5 mm was continuously supplied to the fluidized bed of the reactor at a rate of 200 gram/hour while the nitrided product was continuously taken out of the reactor at such a rate that the fluidized bed was kept at a height of 300 mm. The nitrided product obtained at this point was a relatively consistent silicon nitride powder having an average amount of nitriding of 70% and a rate of $\beta$ conversion of 10%.

Then the nitrided product was continuously supplied to a shaft kiln having an inside diameter of 80 mm and a heat zone length of 500 mm at a rate of 230 gram/hour. While a reactive gas in the form of a gas mixture of 3 N-liter/min. of $N_2$ gas and 0.75 N-liter/min. of $H_2$ gas was supplied to the reactor, secondary nitriding reaction was effected at 1400° C. The resulting reaction product was allowed to move down under gravity and continuously discharged from the reactor by means of a rotary valve.

The final nitrided product was a substantially consistent silicon nitride powder having an amount of nitriding of 100% and a rate of $\beta$ conversion of 13%.

EXAMPLE 2

The intermediate nitrided product which was obtained by nitriding the same source material in the same fluidized bed as in Example 1 was continuously supplied to a rotary kiln having an inside diameter of 80 mm and a length of 1500 mm at a rate of 200 gram/hour. While a reactive gas in the form of a gas mixture of 3 N-liter/min. of $N_2$ gas and 0.75 N-liter/min. of $H_2$ gas was supplied to the reactor, secondary nitriding reaction was effected at 1400° C. The reaction product was continuously removed from the reactor.

The final nitrided product was a substantially consistent silicon nitride powder having an amount of nitriding of 100% and a rate of $\beta$ conversion of 14%.

COMPARATIVE EXAMPLE 1

The same source material as used in Example 1 was supplied directly, without passing a fluidized bed, to a moving bed reactor of the same type as used in Example 1 for nitriding reaction. The source material of metallic silicon powder melted and aggregated in a zone where a temperature of 1250° to 1400° C. prevailed, blocking further flow of the source material.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing silicon nitride powder comprising the steps of:

continuously supplying a nitriding source material containing metallic silicon powder to a fluidized bed composed of silicon nitride and a reactive gas containing nitrogen or ammonia gas where primary nitriding reaction is effected until the metallic silicon powder is nitrided to an amount of at least 50%, continuously removing the resulting nitrided product from the fluidized bed, and admitting the nitrided product into a moving bed reactor where secondary nitriding reaction is effected for nitriding the unreacted source material with a reactive gas containing nitrogen or ammonia gas.

2. The method of claim 1 wherein the nitriding source material is metallic silicon powder having a mean diameter of 149 μm to 4 mm.

3. The method of claim 1 wherein the nitriding source material is a mixture of metallic silicon powder and 5 to 50% by weight of silicon nitride powder, both having a mean diameter of 149 μm to 4 mm.

4. The method of claim 1 wherein the primary nitriding reaction is effected until the metallic silicon powder is nitrided to an amount of 60 to 90%.

5. The method of claim 1 wherein the primary nitriding reaction is effected at a temperature of 1000° to 1500° C.

6. The method of claim 1 wherein the secondary nitriding reaction is effected at a temperature of 1200° to 1600° C.

* * * * *